United States Patent
White et al.

(10) Patent No.: US 10,621,340 B2
(45) Date of Patent: Apr. 14, 2020

(54) HYBRID HYPERVISOR-ASSISTED SECURITY MODEL

(71) Applicant: Intel Corporation, Santa Clara, CA (US)

(72) Inventors: Edmund H. White, Hillsboro, OR (US); Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 15/254,088

(22) Filed: Sep. 1, 2016

(65) Prior Publication Data
US 2018/0060574 A1    Mar. 1, 2018

(51) Int. Cl.
*G06F 21/55*    (2013.01)
*G06F 9/455*    (2018.01)

(52) U.S. Cl.
CPC ........ *G06F 21/554* (2013.01); *G06F 9/45558* (2013.01); *G06F 2009/45587* (2013.01); *G06F 2221/033* (2013.01)

(58) Field of Classification Search
CPC ............... G06F 21/554; G06F 9/45558; G06F 2009/45587; G06F 2221/033; G06F 21/53
See application file for complete search history.

(56) References Cited

U.S. PATENT DOCUMENTS

| | | | | |
|---|---|---|---|---|
| 8,037,529 B1* | 10/2011 | Chiueh | ............... | G06F 21/577 |
| | | | | 713/188 |
| 2009/0271786 A1* | 10/2009 | Groth | .................. | G06F 9/5077 |
| | | | | 718/1 |
| 2010/0281273 A1 | 11/2010 | Lee et al. | | |
| 2012/0254993 A1* | 10/2012 | Sallam | ................... | G06F 21/53 |
| | | | | 726/22 |

(Continued)

FOREIGN PATENT DOCUMENTS

WO    2013-055502 A1    4/2013

OTHER PUBLICATIONS

International search report for PCT application No. PCT/US2017/044885, dated Nov. 15, 2017 (3 pages).

(Continued)

*Primary Examiner* — Linglan E Edwards
*Assistant Examiner* — Forrest L Carey
(74) *Attorney, Agent, or Firm* — Barnes & Thornburg LLP

(57) ABSTRACT

A technique allows for a hybrid hypervisor-assisted security model that monitors and protects an operating system from rootkits or other malware through use of monitoring policies for the operating system (OS). The OS monitoring policies may be separated into rules that can be enforced using an in-guest agent running in a monitored guest OS domain and an out-of-guest agent running in a privileged/monitoring guest OS domain. Embodiments may use virtualization technologies including permissions and policies in one or (Continued)

more page tables (and virtualization exceptions (# VE) to avoid virtual machine (VM) exits during runtime events and thereby, avoid context switching into a hypervisor. An embodiment includes configuring the in-guest agent in a monitored OS such that hardware events can be switched to lightweight events and can be dynamically switched to complex processing in the privileged OS domain only when requested.

23 Claims, 5 Drawing Sheets

(56) References Cited

U.S. PATENT DOCUMENTS

| | | |
|---|---|---|
| 2013/0111211 A1 | 5/2013 | Winslow et al. |
| 2013/0117823 A1 | 5/2013 | Dang et al. |
| 2014/0137180 A1 | 5/2014 | Lukacs et al. |
| 2014/0283056 A1* | 9/2014 | Bachwani ............... G06F 21/56 726/23 |
| 2014/0331224 A1* | 11/2014 | Robenko ............. G06F 9/45533 718/1 |
| 2015/0121366 A1* | 4/2015 | Neiger ................. G06F 9/4555 718/1 |
| 2016/0210069 A1* | 7/2016 | Lutas .................... G06F 3/0622 |
| 2018/0004943 A1* | 1/2018 | Lukacs ................. G06F 21/554 |

OTHER PUBLICATIONS

Written opinion for PCT application No. PCT/US2017/044885, dated Nov. 15, 2017 (5 pages).

* cited by examiner

HYBRID HYPERVISOR-ASSISTED SECURITY MODEL

TECHNICAL FIELD

Embodiments described herein generally relate to computer security and, more particularly, to techniques for protecting and monitoring an operating system from rootkits and other malware using virtualization exceptions and extended page tables.

BACKGROUND ART

Operating systems typically employ monolithic kernels that provide basic services for all other parts of the operating system. These kernels form part of a trusted computing base (TCB) of the operating system (OS), which is the set of all hardware, firmware, and/or software components that are critical to the security of the operating system, in the sense that bugs or vulnerabilities occurring inside the TCB might jeopardize the security properties of the entire system. As the code that makes up the kernel is needed continuously, it is usually loaded into computer storage in an area that is protected. Attacks by malware and rootkits can add code or replace portions of the core operating system at both the kernel and its associated device drivers. Kernel-mode attacks against the trusted computing base can be difficult to detect since they operate at the same security level as the operating system.

In response to kernel-mode attacks against large TCB operating systems, security hypervisors are used. In some implementations, a small TCB security hypervisor with hardware virtualization is used to protect the OS's memory and central processing unit (CPU) state changes. Hardware virtualization can include, for example, Extended Page Tables (EPTs) in conjunction with a trusted in-guest agent running inside the operating system. These systems may detect memory events such as, for example, external interrupts or attempts to access privileged registers or resources. However, detecting an event may cause a virtual machine exit (VM exit) when an event, operation or situation, such as an external interrupt, attempts to access privileged registers or resources. This event, operation or situation is intercepted causing the virtual processor to exit the virtual machine environment through the VM exit so that the hypervisor may implement virtualization policies.

Other existing solutions require a significant amount of code and data to be resident in the same operating system that the solutions are trying to protect. If there is any flaw in either the policy or the code that implements the protection, malware could potentially completely disable the solution. The large amount of code and data not only represents a large attack surface, it also represents a large detection surface, which can be a potentially significant issue for products that use virtualized sandboxes for behavioral analysis and are susceptible to evasion by sophisticated malware.

Other solutions include using general purpose hypervisors for monitoring OS memory and CPU state. In these solutions, the operating system is running in a first guest VM that is to be protected with protection software running in a second, privileged, guest VM. However, this approach has a very high overhead through multiple VM exits/entries as enforcing policies may induce many memory access events that need the first guest virtual machine to be de-scheduled and the second guest virtual machine to be scheduled synchronously. Also, CPU assists that can avoid VM exits such as virtualization exceptions cannot operate across CPU threads currently and hence cannot be leveraged across guest domains either.

A technique for protecting/monitoring an operating system without the high-overhead of VM exits while also providing the benefits of low-latency and the flexibility of an agent operating in a separate VM would be desirable.

DESCRIPTION OF EMBODIMENTS

Figure 1:
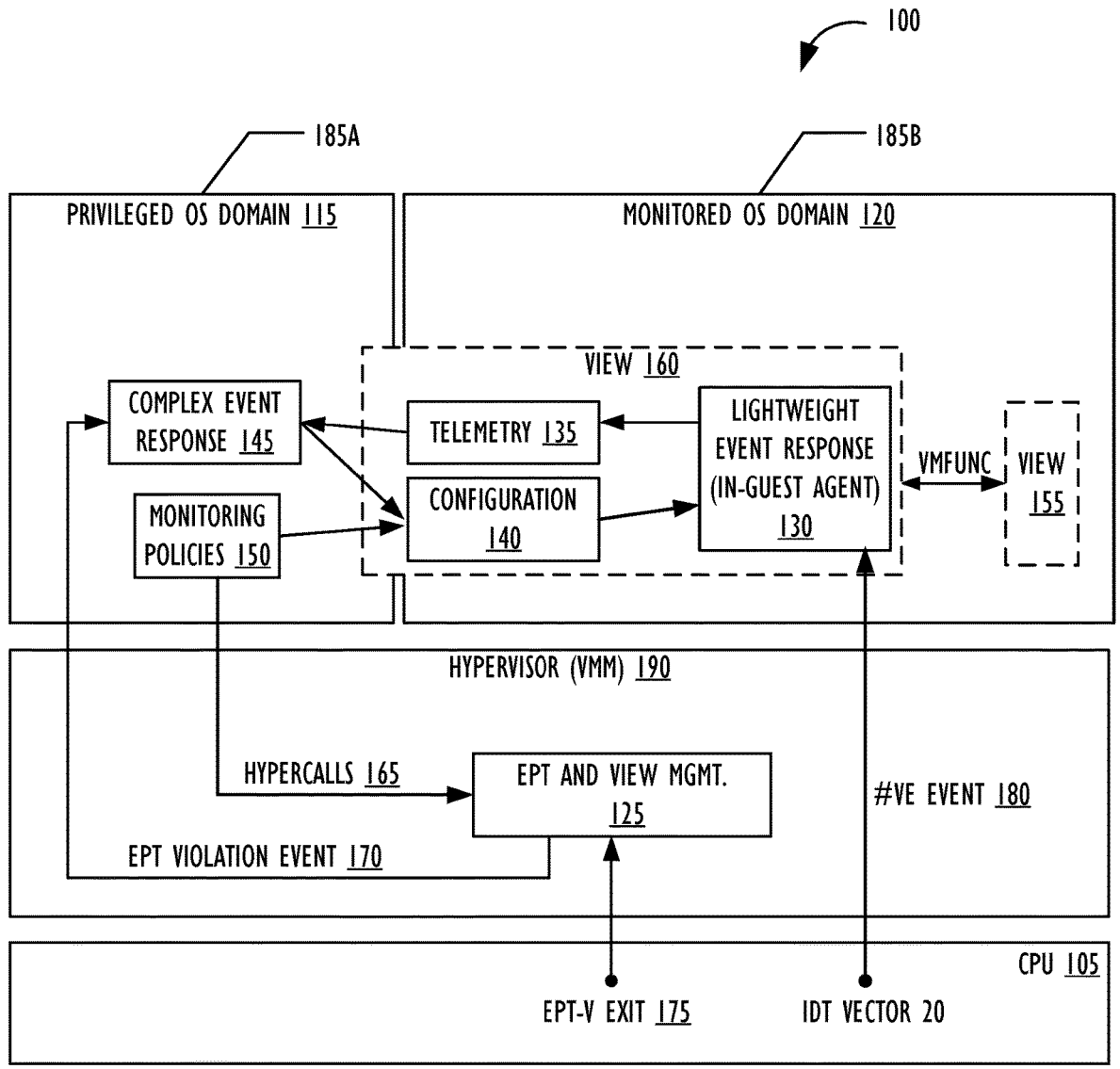
FIG. 1 is a block diagram illustrating an architecture upon which an embodiment of the invention may be implemented.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by a programmable device. Similarly, "a medium" can refer to a single physical medium or a plurality of media that together may store the material described as being stored on the medium.

As used herein, the term "malware" can refer to any software used to disrupt operation of a programmable device, gather sensitive information or gain access to private systems or networks. Malware includes computer viruses (including worms, Trojan horses, etc.), Bots, ransomware, spyware, adware, scareware, software exploits and any other type of malicious programs or code.

As used herein, the term "rootkit" can refer to a collection of computer software, typically malicious, designed to enable access to a computer or areas of its software that would not otherwise be allowed, for example, access to an unauthorized user while at the same time masking its existence or the existence of other software. Rootkits can include user mode and kernel mode software and are designed to hide the existence of itself or certain processes/programs from normal methods of detection and enable continued privileged access to a computer. Kernel-mode rootkits lie deep inside the operating system and load before most boot or other drivers and before traditional user-mode level protections.

As used herein, the term "Virtualization Technology (VT)" can refer to a set of hardware enhancements to a computing platform that allows the computing platform to run multiple operating systems and applications in independent partitions on a single computer system or multiple instances of the same operating system on a single computer system. VT allows one computer system to function as multiple virtual computing systems.

As used herein, the term "hypervisor or a Virtual Machine Monitor (VMM)" can refer to a software program that creates virtual machines, manages virtual machines and implements virtualization policies. The hypervisor manages the system's processor, memory, and other resources to allocate what each virtual machine and its guest operating system requires. A hypervisor acts as a host and has full control of the processor(s) and other platform hardware. A hypervisor presents virtual operating systems with an abstraction of a virtual processor and allows them to execute directly on a logical processor. A hypervisor is able to retain selective control of processor resources, physical memory, interrupt management, and I/O.

As used herein, the term "Extended Page Table Virtualization (EPT Virtualization)" can refer to a hardware assist to memory virtualization, which includes mapping within the hypervisor between the physical memory and the page tables in the guest OSs. A guest OS stores the mapping between virtual memory addresses and guest physical memory addresses in page tables while the hypervisor stores the mapping between guest physical memory addresses and machine page addresses (or host physical addresses) in hardware.

As used herein, the term "Virtualization Exception (# VE)" can refer to a guest exception to an EPT violation within a guest OS of a VM that results in a direct transfer of control to the VM to handle the EPT violation instead of a VM exit to a hypervisor. A # VE handles EPT violations directly in the guest OS context without a VM exit and may switch EPT paging-structure hierarchy directly in the guest OS context without transferring control or exiting to the hypervisor.

A technique provides a method or technique for a hybrid hypervisor-assisted security model that monitors and protects a computer system from rootkits or other malware through use of monitoring policies for an OS. In an embodiment, the OS monitoring policies may be separated into rules that can be enforced using two agents: a lightweight or in-guest agent running in a monitored guest OS domain and a heavyweight or out-of-guest agent running in a privileged/monitoring guest OS domain. Embodiments described herein may use virtualization technologies to monitor guest OS domains for malware and rootkits during execution of untrusted software. With virtualization, a VMM or hypervisor may use permissions and policies defined in one or more EPTs and use # VE to avoid VM exits during runtime events and thereby, avoid context switching into the hypervisor. In an embodiment, the monitoring/privileged OS domain, may perform actions and make a hypercall to a VMM to transfer control back to the monitored OS domain. In an embodiment, a monitoring policy used to protect an OS may be partitioned or separated between the lightweight in-guest agent and the heavyweight out-of-guest agent where the lightweight agent may use a simple policy to protect the monitored OS domain and the CPU while all of the complex processing may be performed by the heavyweight out-of-guest agent to process potential violations. Another embodiment includes configuring an in-guest agent in a monitored OS domain such that hardware events can be switched to lightweight events and can be dynamically switched to complex processing in a privileged OS domain only when requested. Another embodiment can include redirecting an event from the in-guest agent to the out-of-guest agent by switching to an EPT (called a view) using a virtual machine control structure (VMCS) so that the memory pages in an EPT for an event can be configured by the hypervisor to always call an EPT violation.

Referring to the figures, FIG. 1 is a schematic diagram of an embodiment of an architecture 100 for a hybrid hypervisor-assisted security model that may be used for protecting an operating system from rootkits and other malware using monitoring policies for one or more VMs. Architecture 100 can include software components such as a privileged OS domain 115, monitored OS domain 120, a hypervisor/VMM 190, and a CPU 105. Architecture 100 may be used with programmable device 300 of FIG. 3 for implementing embodiments of the invention described herein.

CPU 105 may be any data processing apparatus capable of executing any OS, hypervisor 190 or other software. CPU 105 may include a plurality of processor cores 374a-b, 384a-b (FIG. 3) and memories 332-334 (FIG. 3) and may be configured to convey a # VE event 180 directly to the lightweight event response engine or in-guest agent 130, as will be discussed below. The CPU 105 may be configured to run a hypervisor 190 that is installed on CPU 105. In an example, CPU 105 may interface with one or more VMs 185a-185b that are instantiated by hypervisor 190.

Figure 3:
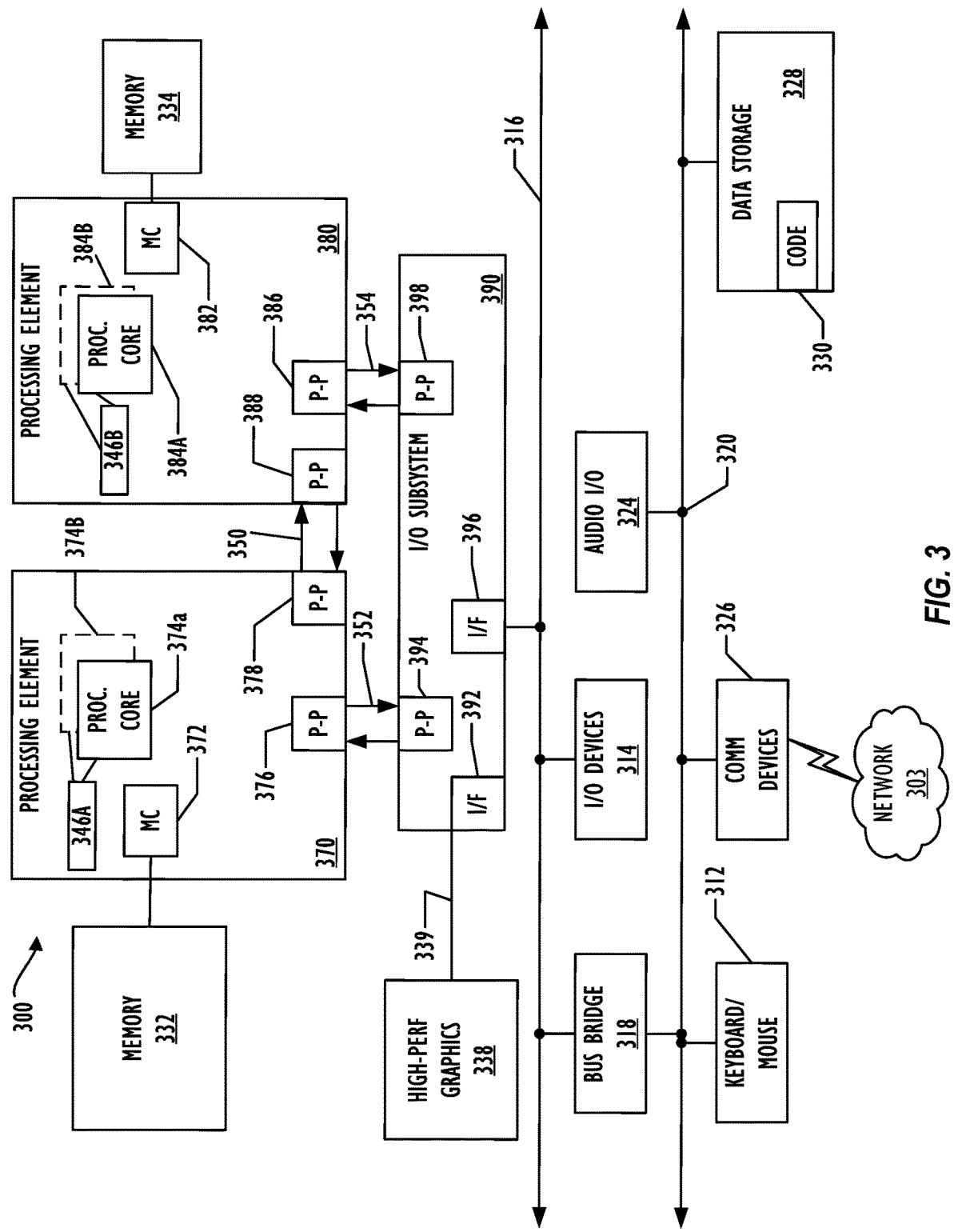
FIG. 3 is a diagram illustrating a computing device for use with techniques described herein according to one embodiment.

Each guest VM 185a-185b may include an OS and operating software that is resident on each VM 185a-185b and may be referred to as a "guest OS." Each VM 185a-185b may present a plurality of guest OSs in a privileged/monitoring OS domain 115 and a monitored OS domain 120, respectively. Each OS domain 115, 120 may have access to host resources such as memories 332-334 (FIG. 3), I/O Devices 314 (FIG. 3), data storage 328 (FIG. 3), or other resources of programmable device 300 (FIG. 3). The hypervisor 190 may support, for each of its guest OS domains 115, 120, a "guest address space," which includes a mapping from the addresses that the guest OS "thinks" are physical (guest-physical addresses) to true physical addresses that can be used to access physical memories 332-334 (FIG. 3) of programmable device 300 (FIG. 3). The mapping may also specify access rights (e.g., read/write, read-only, etc.) for each guest-physical address. The hypervisor 190 may implement these guest address spaces using EPT. The hypervisor 190 may also provide separate memory views via EPT tables using view 155 for software components in the monitored OS domain 120. While two OS domains 115, 120 are depicted in FIG. 1, additional OS domains substantially similar to OS domain 115 or OS domain 120 are also contemplated within the scope of the invention.

In an embodiment, the hypervisor 190 may monitor EPT violations and other events in the monitored OS domain 120. The hypervisor 190 may also convey instructions to the CPU 105 turn on # VE through instructions received by the EPT View management engine 125. EPT view management engine 125 may receive instructions from the monitoring policies engine 150 regarding turning # VE for events detected by the hypervisor 190. The EPT view management engine 125 may also receive instructions to exit a particular EPT view in a guest OS domain or context switch out of the guest OS domain using information received from an EPT-V exit interface 175. The hypervisor 190 may turn on # VE based on one or more events that are detected while running untrusted software or applications in the monitored OS domain 120. Any one or more of any number of other events may raise, cause, or result in a # VE based on monitoring policy defined by the complex event response engine 145 instead of causing a VM exit.

The privileged OS domain 115 is a guest operating system that includes a complex event response engine (or out-of-guest agent) 145 and a monitoring policies engine 150. The complex event response engine 145 may create monitoring policies that are partitioned/separated between the complex event response engine 145 and the in-guest agent 130. In one example, the complex event response engine 145 may define policies for shared pages of memory using EPT tables that may be used to monitor the monitored OS domain 120 when running untrusted software or applications. The complex event response engine 145 of the privileged OS domain 115 may create monitoring policies characterized by rules for pages of memory in the EPT to monitor execution of untrusted software or applications or other malware in the monitored OS domain 120. For example, when executing untrusted software or applications in the monitored OS domain 120, if any protected guest physical memory or monitored guest physical memory for the monitored OS domain 120 is written, an EPT violation (or memory event) based on the defined monitoring policy may be detected by hypervisor 190 and may be sent to privileged OS domain 115 as an EPT violation event 170. The EPT tables may specify access permissions for the guest OS domains 115, 120 that may be used to implement multiple memory protections or partitions efficiently using the shared pages of memory. Other policies can include identifying monitored events such as exceptions (e.g., page faults, and other protection faults), interrupts (e.g., hardware interrupts and software interrupts), and platform events (e.g., system management interrupts). The complex event response engine 145 may respond to events that occur in the monitored OS domain 120 based on the monitoring policies. The complex event response engine 145 may also update the policies, defined in the configuration table 140, for subsequent use by identifying the memory addresses that caused an event or EPT violation and may permit the operation to continue or terminate the process.

In an embodiment, the complex event response engine 145 may communicate monitoring policies that are currently active through the monitoring policies engine 150. For example, the monitoring policies engine 150 may communicate monitoring policies to a configuration table 140. The configuration table 140 may store policies that are currently active for one or more of the multiple EPTs. The complex event response engine 145 may define these policies for signaling reads, writes, or executes to memory locations through the multiple EPTs. By having multiple EPTs, differing access permissions may be defined for each EPT across the OS domains 115, 120, which can be easily swapped around by changing the active EPT index using an EPTP in a Virtual Machine Control Structure (VMCS) that is configured for each VM 185a-185b. The VMCS is a page of memory in which the hypervisor 190 may write configuration data for the VMs 185a-185b such as, for example, configuration data for how interrupts are handled, initial control register values during guest entry, protected or monitored memory addresses, a pointer to a page of candidate EPT pointers (EPTP), or the like. The EPTP are pointers to different EPT page table hierarchies, with each one giving a different guest physical address to machine physical address mapping. The hypervisor 190 may set up this page of EPTP and may also configure the VMCS to fully enable EPT. The VMFUNC function is a VM switching function that may be called by a VM to allow software in the monitored OS domain load a new value for an EPTP, thereby establishing a different EPT paging-structure hierarchy defined in view 155 which may be accessible by the monitored OS domain 120 without exiting into the hypervisor 190 through a VM exit.

The complex event response engine 145 may also be configured to communicate monitoring policies to the hypervisor 190 by sending instructions to an EPT View management engine 125 using a hypercall interface 165. The complex event response engine 145 may generate an event response to act on the event based on the EPT violation event, for example, an event that writes to a memory address in the monitored OS domain 120. For example, the complex event response engine 145 may allow the write to memory address if it determines that the write is to a benign portion of the kernel. Other writes to protected portions of the kernel may not be authorized. The complex event response engine 145 may also be configured to notify the hypervisor 190 of the same or similar event so that subsequent reads and writes to these memory addresses for the same event may be allowed in the future.

The complex event response engine 145 communicates with the hypervisor 190 through a hypercall interface 165. The hypercall interface 165 communicates instructions, from the complex event response engine 145 to the hypervisor 190, which are related to turning on # VE based on an EPT event. A # VE instruction enables low-latency EPT memory events in the monitored OS domain 120 without any VM exits. In embodiments, an EPT violation event can include external interrupts, attempts to access privileged registers or attempts to access privileged resources. Subsequent events to memory pages will create a # VE event 180, instead of an EPT violation, allowing the process to continue.

The monitored OS domain 120 is a guest operating system that includes a lightweight event response engine (or in-guest agent) 130, telemetry 135, and configuration table 140. The in-guest agent 130 may analyze the monitoring policies created by the complex event response engine 145 and, using access information conveyed by CPU 105 through the # VE event 180, may allow reads, writes or executes to a memory page or alternatively block the access. The in-guest agent 130 and the complex event response engine 145 form part of a trusted computing base, which represents a set of hardware, firmware, and software components that are critical to the security of architecture 100. Telemetry 135 can include memory addresses that are associated with a shared memory interface for the monitored OS domain 120. Based on an event response by the in-guest agent 130 that may allow access to reads or writes to memory based on EPT violations, the in-guest agent 130 may write information related to this access to the shared memory interface. View 160 represents a specific protected trusted computing base including the in-guest agent 130, configuration table 140 and telemetry 135, that may not be tampered with by malware or other rootkits.

Figure 2:
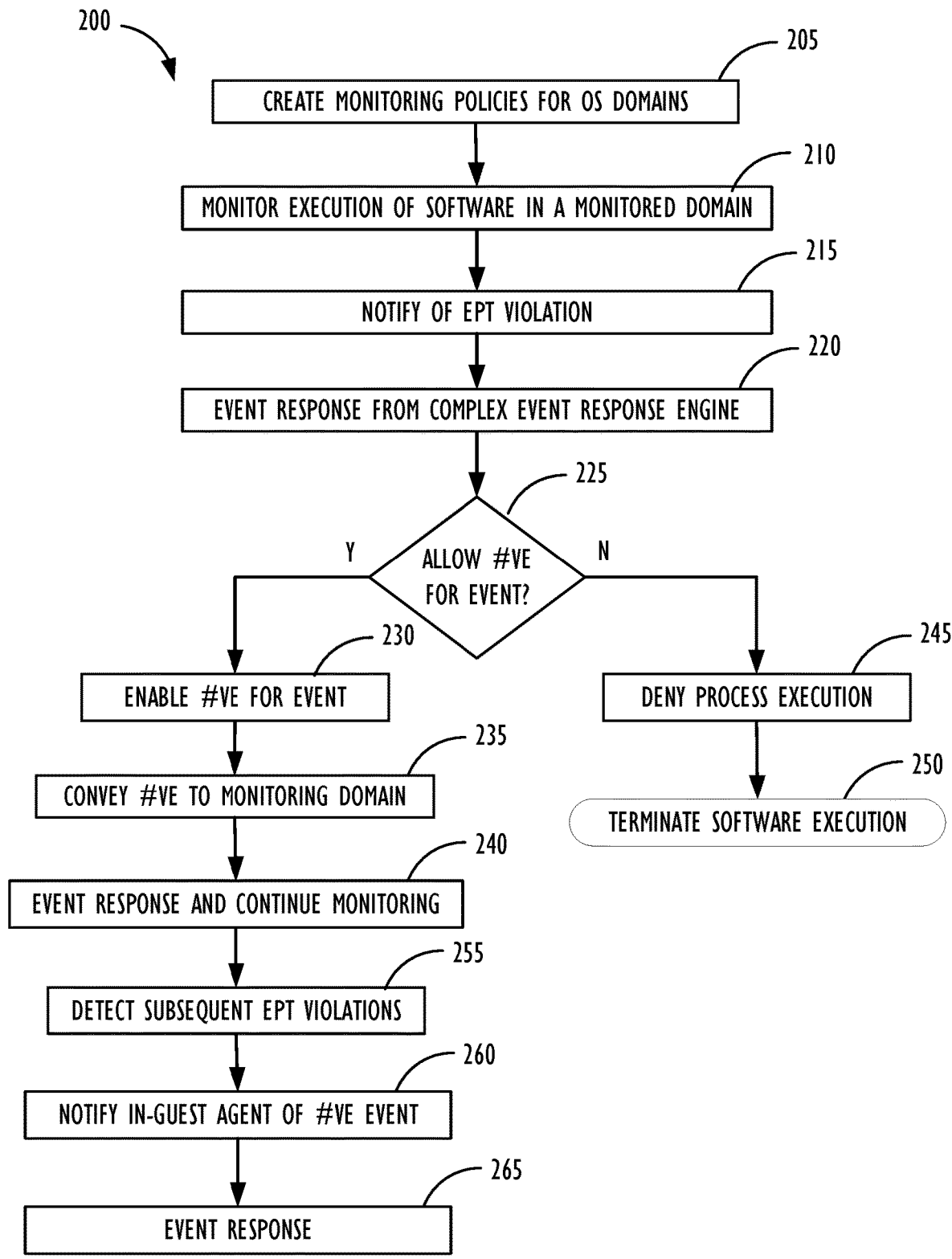
FIG. 2 is a flowchart illustrating a technique for monitoring and protecting an OS from malware according to one embodiment.

FIG. 2 depicts a flowchart illustrating a technique 200 for protecting an operating system from untrusted software such as rootkits and other malware or applications according to one embodiment. Technique 200 may illustrate a method for implementing a hybrid hypervisor-assisted security model that includes configuring monitoring policies for one or more virtual machine OS domains using hardware virtualization technologies such as, for example, a VMFUNC function and a # VE to monitor and protect the virtual machine OS domains during execution of untrusted software or applications like rootkits and malware.

With continued reference to FIG. 1, technique 200 starts in 205 where monitoring policies for one or more VM OS domains are created. In an example, the complex event response engine 145 may configure monitoring policies for pages of memory for the monitored OS domain 120, when active. The policies include memory access rules that are defined in one or more EPT page tables. The complex event response engine 145 may be configured to partition or separate the monitoring policies between the complex event response engine 145 of the privileged OS domain 115 and the in-guest agent 130 of the monitored OS domain 120. Policies may be created to determine how programmable device 300 responds to events that may be detected, while running untrusted software and other applications in monitored OS domain 120. In one example, the complex event response engine 145 may set policies for events that are determined by the hypervisor 190, which relate to pages of memory and other non-memory related events using EPT tables. The monitoring policies may be used to signal reads, writes or executes through the EPT tables when running untrusted software or applications including potential malware or rootkits in the monitored OS domain 120. The policies may be implemented using one or more EPT page tables whose views can be switched in hardware between the monitoring and the monitored OS domains 115, 120 through a VMFUNC function. These policies may be created and monitored by the complex event response engine 145 when these untrusted software or applications are executed within the monitored OS domain 120.

In 210, untrusted software or applications may be executed in the monitored OS domain 120 and its execution is monitored. For example, the privileged OS domain 115 may use the policies defined for one or more EPTs to identify EPT violations and other events during execution of untrusted software or applications. The hypervisor 190 may monitor, in some examples, memory events, non-memory events and other violations of the current security policy such as, for example, unpermitted access to a page or other data structure, external interrupts or attempts to access privileged registers or resources and may respond to these events by sending a notification to the complex event response engine 145 in privileged OS domain 115 of an EPT violation or notification of other events that may violate the current security policy. In one example, during execution of untrusted software or applications in the monitored OS domain 120, if any reads, writes or executes affect privileged or protected memory pages, based on a monitoring policy, a violation event through EPT violation event interface 170 may be generated by the hypervisor 190.

In 215, the hypervisor 190 may be configured to notify the complex event response engine 145 of EPT violations through the EPT violation event interface 170. In an embodiment, the hypervisor 190 may be configured to detect security policy violations and other events including EPT violations using the EPTs and non-memory related events for the monitored OS domain 120. The hypervisor 190 may notify the complex event response engine 145 of these EPT events and/or EPT violations of the security policy when executing software or instructions in the monitored OS domain 120. For example, the hypervisor 190 may notify the complex event response engine 145 of an EPT violation event that can include reads, writes or executes to memory addresses or other protected areas including reads, writes or executes to OS kernel code, user mode stacks and heaps, kernel driver code and data, kernel data, interrupt descriptor table (IDT), or the like.

In 220, the complex event response engine 145 may respond to the EPT event with instructions to the hypervisor 190 using the hypercall interface 165, based on the monitoring policies sent from the monitoring policies engine 150. In embodiments, the complex event response engine 245 may notify the hypervisor 190, based on the monitoring policies, that EPT violations can be resolved by the in-guest agent 130 without requiring complex logic or, alternatively, may notify the hypervisor 190 that EPT violations that require complex logic and other events related to non-memory state can be resolved by the complex event response engine 145 or by another privileged guest. The complex event response engine 145 may instruct the hypervisor 190 to transfer control back to the monitored OS domain 120 to resolve or respond to the event. Event response by the in-guest agent 130 can include providing continued access to one or more memory pages based on the policies defined for an EPT view. For example, based on monitoring policies for views of the privileged OS domain 115, the complex event response engine 145 may allow a # VE for an event if the complex event response engine 145 determines that a write to a physical memory address in the monitored OS domain 120 is a write to a benign portion of the kernel. Other writes to the kernel may be disallowed or handled by the complex event response engine 145 by switching EPT views that can be accessed by the complex event response engine 145. In an embodiment, if there is reason to suspect that the in-guest agent may be under attack by the untrusted software or application being executed in the monitored OS domain 120, the event response can be shifted to the complex event response engine 145 by switching to an EPT view so that pages in that EPT view may be configured by the hypervisor 190 to always cause an EPT violation and/or with an explicit VM call or VM exit.

In 225, the hypervisor 190 may determine, based on the monitoring policies, if a # VE is allowed for the EPT event. In an embodiment, the hypervisor 190 may analyze the instructions received through hypercall interface 165 to determine if # VE should be allowed for the event based on monitoring policies created by the complex event response engine 145.

If # VE should be allowed (i.e., step 225="Y"), then, in 230, the hypervisor 190 may configure one or more VMCSs to enable # VE for the detected event. The hypervisor 190 may turn on # VE for the page of memory to allow the particular access in the monitored OS domain 120 for the process to continue. In another embodiment, can include redirecting an event from the in-guest agent to the out-of-guest agent by switching to an EPT (called a view) using a virtual machine control structure (VMCS) so that the memory pages in an EPT for an event can be configured by the hypervisor to always call an EPT violation.

The hypervisor 190 and complex event response engine 145 may agree on an extended format for the contents of the # VE information page that describes any event related to CPU 105 and memory state of CPU 105 and all events may be delivered directly from the CPU 105 through an IDT vector 20 and automatically serialized and synchronized with events generated by the CPU 105. For example, # VE may be enabled globally through several bits in the VMCS fields such as an Exit Reason field having 32 bits, Exit Qualification field having 64 bits, Guest Linear Address field having 64 bits and Guest Physical Address field having 64 bits and a specific EPTE through a reserved bit (for example, bit 63). In other non-limiting embodiments, the # VE may be enabled with additional bits or the specific EPTE, may be enabled through other bits instead of bit 63. The # VE information page may contain a 32-bit semaphore (or busy) field.

However, in 225, if the hypervisor 190 determines that # VE is not allowed for the event (i.e., step 225="N"), then, in 245, access to the particular process is denied by the hypervisor 190 and/or with a VM exit. VM exit may also result in termination of software execution in 250.

In 235, the # VE is delivered directly from the CPU 105 to the in-guest agent 130. In an example, the # VE may be delivered to the guest agent 130 through an interrupt descriptor table (IDT) vector 20 as an exception. The in-guest agent 130 may be responsible for taking control of IDT vector 20. In an embodiment, a 4 KB # VE information page may be shared between the CPU 105 and the in-guest agent 130 whereby the in-guest agent 130 and the hypervisor 190 agree on the address of a # VE information page for each CPU, and the hypervisor 190 places the address of each page in the relevant VMCS.

In 240, the in-guest agent 130 may respond to the event based on the # VE. In an embodiment, event response can include providing continued access to one or more memory pages based on the # VE that can includes allowing a write to a physical memory address in the monitored OS domain 120 that triggered the event if it is determined that the write is to a benign portion of the kernel. Thereafter, in-guest agent 130 may continue monitoring untrusted software or applications that is executed in the monitored OS domain 120.

In 255, the hypervisor 190 may continue monitoring for EPT violations during execution of untrusted software or applications and may identify future EPT violations. In an embodiment, the hypervisor 190 may be configured to detect security policy violations and other events including memory events, non-memory events and other violations of the current security policy such as, for example, unpermitted access to a page or other data structure, external interrupts or attempts to access privileged registers or resources. Hypervisor 190 may notify the complex event response engine 145 of these future events and/or EPT violations of security policy when executing software or instructions in the monitored OS domain 120. In an embodiment, future occurrence of events that read and/or write to the same memory addresses may be allowed when # VE for the event is turned on for the particular event.

In 260, the hypervisor 190 may notify the in-guest agent of the # VE event based on turning on # VE. In an embodiment, the CPU 105 may directly deliver the # VE event to the in-guest agent 130. The # VE information page contains a 32-bit semaphore, or busy, field. When the CPU 205 detects an EPT permissions violation that can be delivered via a # VE as opposed to a VM exit (as indicated by bit 63 or another bit of the relevant EPTE), it first checks the semaphore field in the # VE information page. Unless this field is zero, the violation will be delivered to the hypervisor 190 via a VM exit. Otherwise, the semaphore will be set, details related to the violation will be stored in the # VE information page, and # VE will be delivered to the in-guest agent 230.

In 265, the in-guest agent 130 may analyze the monitoring policy in the configuration table 140 received from the complex event response engine 145 and using access information conveyed by the CPU 105 through the # VE event may allow reads, writes or executes to a memory page or alternatively block the access. In an embodiment, if the in-guest agent determines that access is coming from an allowed memory page and a write or read is to an allowed memory page, then the in-guest agent 130 may invoke the VMFUNC function and switch memory views or the EPT on the CPU 105 to complete the particular access by another OS domain without taking any VM exits. Technique 200 may continue to 240 where execution of untrusted software or applications is monitored until execution is terminated through a VM exit.

Benefits of the embodiments described herein includes monitoring and preventing rootkits and other malware by moving # VE notification to those events into hardware with minimal impact on the hypervisor and no impact on an in-guest agent as well as defining event types that do not directly relate to any current VM exits, and delivering those through the same mechanism serialized with all other events.

Referring now to FIG. 3, a block diagram illustrates a programmable device 300 that may be used with architecture 100 in accordance with one embodiment. The programmable device 300 illustrated in FIG. 3 is a multiprocessor programmable device that includes a first processing element 370 and a second processing element 380. While two processing elements 370 and 380 are shown, an embodiment of programmable device 300 may also include only one such processing element.

Programmable device 300 is illustrated as a point-to-point interconnect system, in which the first processing element 370 and second processing element 380 are coupled via a point-to-point interconnect 350. Any or all of the interconnects illustrated in FIG. 3 may be implemented as a multi-drop bus rather than point-to-point interconnects.

As illustrated in FIG. 3, each processing element 370 and 380 may be multicore processors, including first and second processor cores (i.e., processor cores 374a and 374b and processor cores 384a and 384b). Such cores 374a, 374b, 384a, 384b may be configured to execute instruction code in a manner similar to that discussed above in connection with FIGS. 1-2. However, other embodiments may use processing elements that are single core processors as desired. In embodiments with multiple processing elements 370, 380, each processing element may be implemented with different numbers of cores as desired.

Each processing element 370, 380 may include at least one shared cache 346. The shared cache 346a, 346b may store data (e.g., instructions) that are utilized by one or more components of the processing element, such as the cores 374a, 374b and 384a, 384b, respectively. For example, the shared cache may locally cache data stored in a memory 332, 334 for faster access by components of the processing elements 370, 380. Memory 332, 334 may include one or more machine-readable media that may be encoded with software comprising machine-readable instructions to perform process logic related to the monitoring policies of one or more agents in the VMs 185a-185b (FIG. 1). In one or more embodiments, the shared cache 346a, 346b may include one or more mid-level caches, such as level 2 (L2), level 3 (L3), level 4 (L4), or other levels of cache, a last level cache (LLC), or combinations thereof.

While FIG. 3 illustrates a programmable device with two processing elements 370, 380 for clarity of the drawing, the scope of the present invention is not so limited and any number of processing elements may be present. Alternatively, one or more of processing elements 370, 380 may be an element other than a processor, such as an graphics processing unit (GPU), a digital signal processing (DSP) unit, a field programmable gate array, or any other programmable processing element. Processing element 380 may be heterogeneous or asymmetric to processing element 370. There may be a variety of differences between processing elements 370, 380 in terms of a spectrum of metrics of merit including architectural, microarchitectural, thermal, power consumption characteristics and the like. These differences may effectively manifest themselves as asymmetry and heterogeneity amongst processing elements 370, 380. In some embodiments, the various processing elements 370, 380 may reside in the same die package.

First processing element 370 may further include memory controller logic (MC) 372 and point-to-point (P-P) interconnects 376 and 378. Similarly, second processing element 380 may include a MC 382 and P-P interconnects 386 and 388. As illustrated in FIG. 3, MCs 372 and 382 couple processing elements 370, 380 to respective memories, namely a memory 332 and a memory 334, which may be portions of main memory locally attached to the respective processors. While MC logic 372 and 382 is illustrated as integrated into processing elements 370, 380, in some embodiments the memory controller logic may be discrete logic outside processing elements 370, 380 rather than integrated therein.

Processing element 370 and processing element 380 may be coupled to an I/O subsystem 390 via respective P-P interconnects 376 and 386 through links 352 and 354. As illustrated in FIG. 3, I/O subsystem 390 includes P-P interconnects 394 and 398. Furthermore, I/O subsystem 390 includes an interface 392 to couple I/O subsystem 490 with a high performance graphics engine 338. In one embodiment, a bus (not shown) may be used to couple graphics engine 338 to I/O subsystem 390. Alternately, a point-to-point interconnect 339 may couple these components.

In turn, I/O subsystem 390 may be coupled to a first link 316 via an interface 396. In one embodiment, first link 316 may be a Peripheral Component Interconnect (PCI) bus, or a bus such as a PCI Express bus or another I/O interconnect bus, although the scope of the present invention is not so limited.

As illustrated in FIG. 3, various I/O devices 314, 324 may be coupled to first link 316, along with a bridge 318, which may couple first link 316 to a second link 320. In one embodiment, second link 320 may be a low pin count (LPC) bus. Various devices may be coupled to second link 320 including, for example, a keyboard/mouse 312, communication device(s) 326 (which may in turn be in communication with the computer network 303), and a data storage unit 328 such as a disk drive or other mass storage device which may include code 330, in one embodiment. The code 330 may include instructions for performing embodiments of one or more of the techniques described above. Further, an audio I/O 324 may be coupled to second link 320.

Note that other embodiments are contemplated. For example, instead of the point-to-point architecture of FIG. 3, a system may implement a multi-drop bus or another such communication topology. Although links 316 and 320 are illustrated as busses in FIG. 3, any desired type of link may be used. Also, the elements of FIG. 3 may alternatively be partitioned using more or fewer integrated chips than illustrated in FIG. 3.

Figure 4:
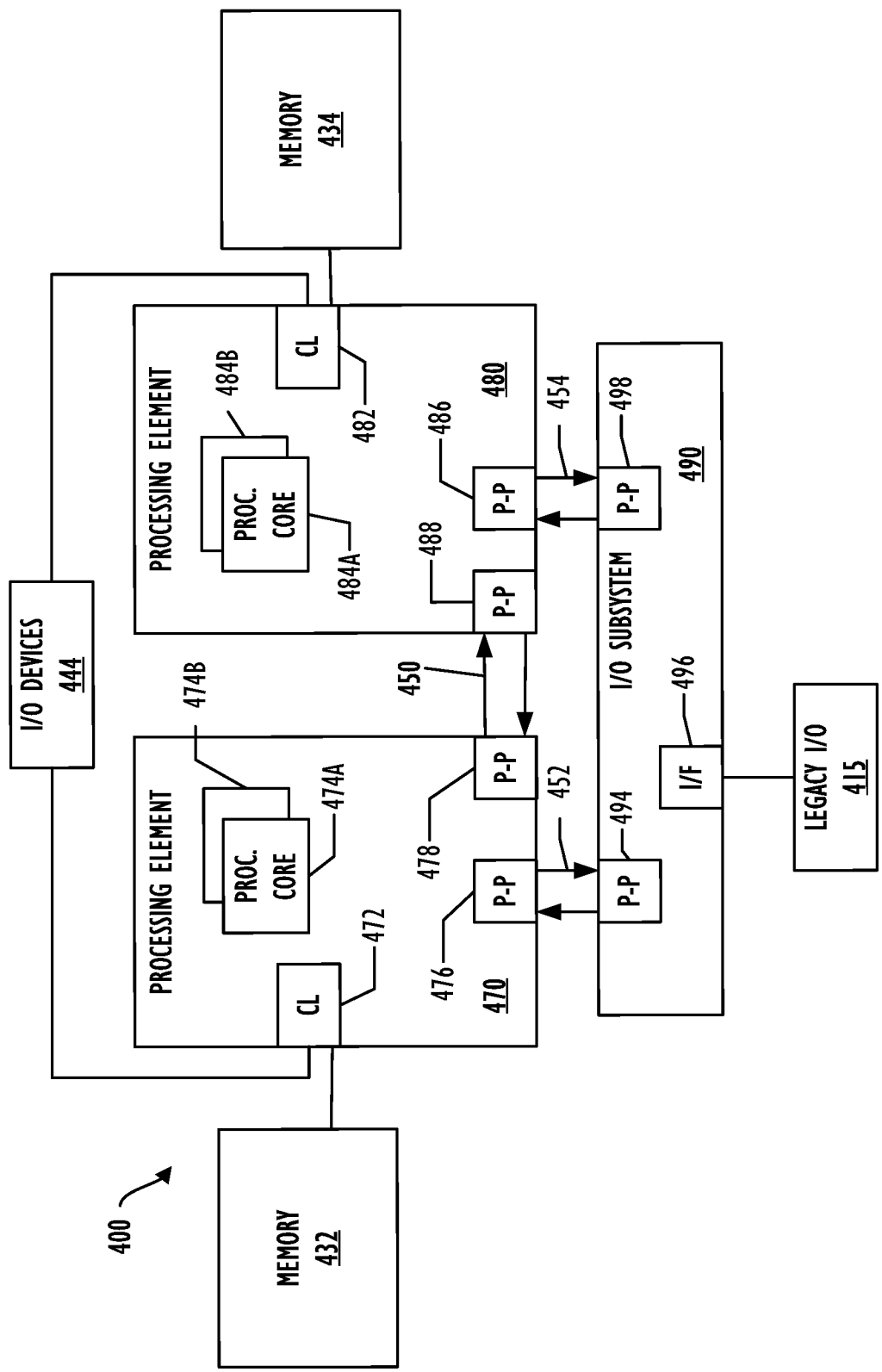
FIG. 4 is a diagram illustrating a computing device for use with techniques described herein according to another embodiment.

Referring now to FIG. 4, a block diagram illustrates a programmable device 400 according to another embodiment. Certain aspects of FIG. 3 have been omitted from FIG. 4 in order to avoid obscuring other aspects of FIG. 4.

FIG. 4 illustrates that processing elements 470, 480 may include integrated memory and I/O control logic ("CL") 472 and 482, respectively. In some embodiments, the 472, 482 may include memory control logic (MC) such as that described above in connection with FIG. 3. In addition, CL 472, 482 may also include I/O control logic. FIG. 4 illustrates that not only may the memories 432, 434 be coupled to the 472, 482, but also that I/O devices 444 may also be coupled to the control logic 472, 482. Legacy I/O devices 415 may be coupled to the I/O subsystem 490 by interface 496. Each processing element 470, 480 may include multiple processor cores, illustrated in FIG. 4 as processor cores 474a, 474b, 484a and 484b. As illustrated in FIG. 4, I/O subsystem 490 includes point-to-point (P-P) interconnects 494 and 498 that connect to P-P interconnects 476 and 486 of the processing elements 470 and 480 with links 452 and 454. P-P interconnects 476, 486, 494 and 498, connect processors to processors and an I/O subsystem 490 and provide packetized data transfer between the direct connections of processors and I/O components. Processing elements 470 and 480 may also be interconnected by link 450 and interconnects 478 and 488, respectively.

The programmable devices depicted in FIGS. 3 and 4 are schematic illustrations of embodiments of programmable devices, which may be utilized to implement various embodiments discussed herein. Various components of the programmable devices depicted in FIGS. 3 and 4 may be combined in a system-on-a-chip (SoC) architecture.

Figure 5:
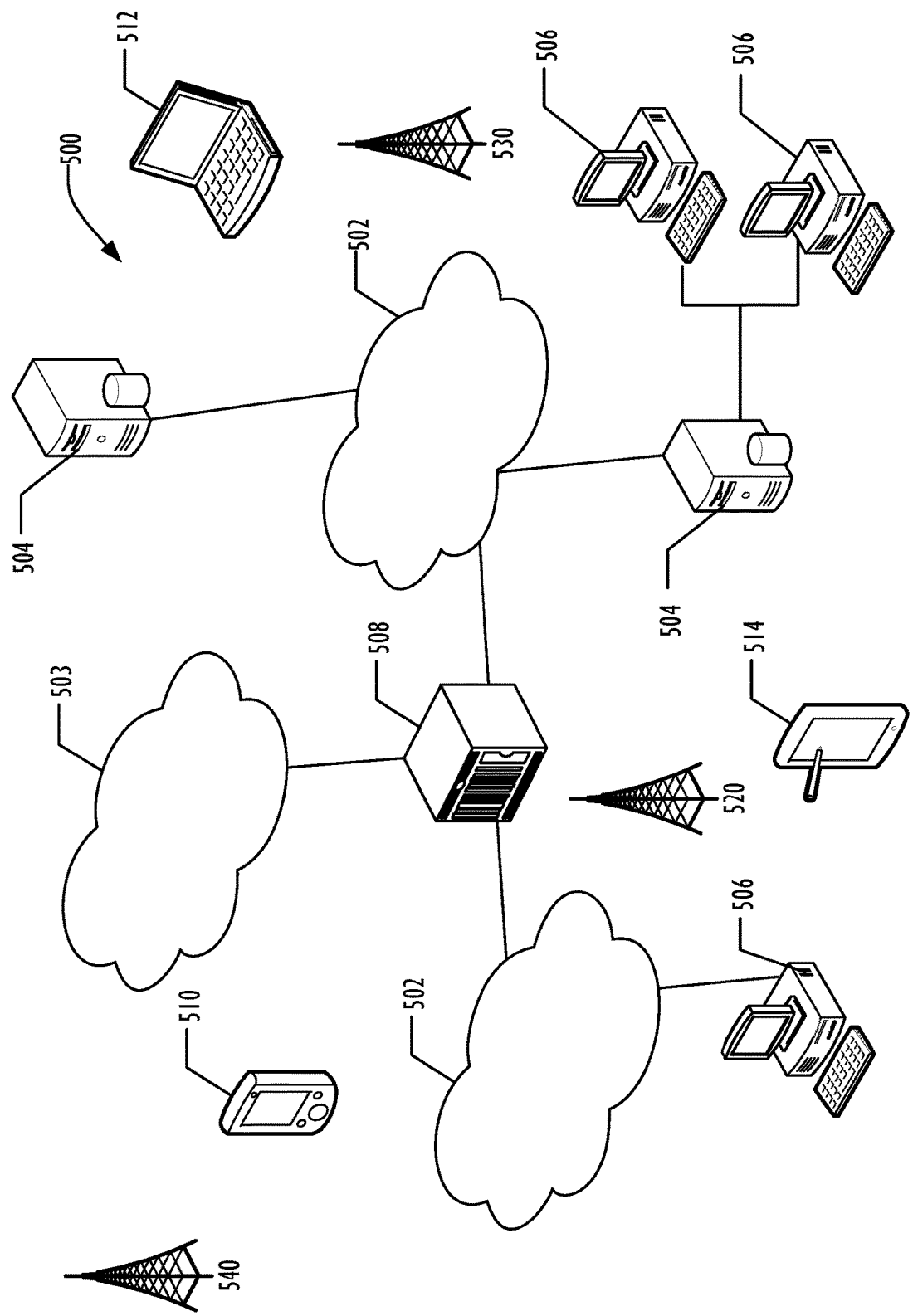
FIG. 5 is a diagram illustrating a network of programmable devices according to one embodiment.

FIG. 5 illustrates an example infrastructure 500 in which the techniques described herein may be implemented is illustrated schematically. Infrastructure 500 contains computer networks 502. Computer networks 502 may include many different types of computer networks available today, such as the Internet, a corporate network or a Local Area Network (LAN). Each of these networks can contain wired or wireless programmable devices and operate using any number of network protocols (e.g., TCP/IP). Networks 502 may be connected to gateways and routers (represented by 508), end user computers 506, and computer servers 504. Infrastructure 500 also includes cellular network 503 for use with mobile communication devices. Mobile cellular networks support mobile phones and many other types of mobile devices. Mobile devices in the infrastructure 500 are illustrated as mobile phones 510, laptops 512 and tablets 514. A mobile device such as mobile phone 510 may interact with one or more mobile provider networks as the mobile device moves, typically interacting with a plurality of mobile network towers 520, 530, and 540 for connecting to the cellular network 503. Although referred to as a cellular network in FIG. 5, a mobile device may interact with towers of more than one provider network, as well as with multiple non-cellular devices such as wireless access points and routers 508. In addition, the mobile devices 510, 512 and 514 may interact with non-mobile devices such as computers 504 and 506 for desired services, which may include monitoring an OS for security violations by rootkits and other malware as described above. The functionality of the architecture 100 may be implemented in any device or combination of devices illustrated in FIG. 5; however, most commonly is implemented in a network system.

The following examples pertain to further embodiments.

Example 1 is one or more machine-readable media, on which are stored instructions, comprising instructions that when executed cause a machine to: configure a monitoring policy for a monitored operating system (OS) domain, the monitoring policy including rules for one or more pages of memory associated with the monitored OS domain; separate the monitoring policy between an in-guest agent in the monitored OS domain and an out-of-guest agent in a privileged OS domain; monitor execution of untrusted software in the monitored OS domain with a hypervisor; detect an event in the monitored OS domain responsive to the execution of untrusted software; and configure the monitored OS domain to respond to the event using the monitoring policy.

In Example 2 the subject matter of Example 1 optionally includes wherein the instructions that when executed cause the machine to detect the event comprise instructions that when executed cause the machine to detect a memory violation associated with the one or more pages of memory using the hypervisor.

In Example 3 the subject matter of Example 1 optionally includes wherein the instructions that when executed cause the machine to detect the event comprise instructions that when executed cause the machine to notify the out-of-guest agent of the event.

In Example 4 the subject matter of any of Examples 1-3 optionally includes wherein the instructions that when executed cause the machine to configure the monitored OS domain to respond to the event comprise instructions that when executed cause the machine to selectively allow a write to a physical memory address in the monitored OS domain.

In Example 5 the subject matter of any of Examples 1-3 optionally includes wherein the instructions that when executed cause the machine to configure the monitored OS domain to respond to the event comprise instructions that when executed cause the machine to deliver a virtualization exception for the event from a central processing unit to the in-guest agent through an interrupt descriptor table vector without a virtual machine exit.

In Example 6 the subject matter of Example 5 optionally includes wherein the instructions that when executed cause the machine to deliver the virtualization exception comprise instructions that when executed cause the machine to selectively allow a write to a physical memory address associated with the virtualization exception for a future occurrence of the event.

In Example 7 the subject matter of any of Examples 1-3 optionally includes wherein the instructions that when executed cause the machine to configure the monitored OS domain to respond to the event comprise instructions that when executed cause the machine to: switch to an alternate page table; generate a virtual machine exit, responsive to the switch; and invoke a complex rule engine in the out-of-guest agent, responsive to the virtual machine exit.

In Example 8 the subject matter of any of Examples 1-3 optionally includes wherein the instructions further comprise instructions that when executed cause the machine to deliver future occurrences of the event via a virtualization exception to the in-guest agent without causing a virtual machine exit.

Example 9 is a method for malware protection, comprising: configuring, with a computing system, a monitoring policy for a monitored operating system (OS) domain, the monitoring policy including rules for one or more pages of memory associated with the monitored OS domain; separating, with the computing system, the monitoring policy between an in-guest agent in the monitored OS domain and an out-of-guest agent in a privileged OS domain; monitoring, with the computing system, execution of untrusted software in the monitored OS domain; detecting, with the computing system, an event in the monitored OS domain responsive to the execution of untrusted software; and configuring, with the computing system, the monitored OS domain to respond to the event using the monitoring policy.

In Example 10 the subject matter of Example 9 optionally includes further comprising detecting a memory violation associated with the one or more pages of memory using a hypervisor.

In Example 11 the subject matter of Example 9 optionally includes further comprising notifying the out-of-guest agent of the event responsive to detecting the event in the monitored OS domain.

In Example 12 the subject matter of any of Examples 9-11 optionally includes further comprising allowing a write to a physical memory address in the monitored OS domain responsive to configuring the monitored OS domain to respond to the event.

In Example 13 the subject matter of Example 13 optionally includes further comprising allow a write to a physical memory address associated with the virtualization exception for a future occurrence of the event.

In Example 15 the subject matter of Example 17 is a computer system for malware protection, comprising: one or more processors; and a memory coupled to the one or more processors, on which are stored instructions, comprising instructions that when executed cause at least some of the one or more processors to: configure a monitoring policy for a monitored operating system (OS) domain, the monitoring policy including rules for one or more pages of memory associated with the monitored OS domain; separate the monitoring policy between an in-guest agent in the monitored OS domain and an out-of-guest agent in a privileged OS domain; monitor execution of untrusted software in the monitored OS domain with a hypervisor; detect an event in the monitored OS domain responsive to the execution of untrusted software; and configure the monitored OS domain to respond to the event using the monitoring policy.

In Example 18 the subject matter of Example 17 optionally includes wherein the instructions further comprise instructions that when executed cause at least some of the one or more processors to detect a memory violation associated with the one or more pages of memory using the hypervisor.

In Example 19 the subject matter of Example 17 optionally includes wherein the instructions further comprise instructions that when executed cause at least some of the one or more processors to notify the out-of-guest agent of the event.

In Example 20 the subject matter of any of Examples 17-19 optionally includes wherein the instructions to configure the monitored OS domain to respond to the event further comprise instructions that when executed cause at least some of the one or more processors to allow a write to a physical memory address in the monitored OS domain.

In Example 21 the subject matter of any of Examples 17-19 optionally includes wherein the instructions to configure the monitored OS domain to respond to the event further comprise instructions that when executed cause at least some of the one or more processors to deliver a virtualization exception for the event from a central processing unit to the in-guest agent.

In Example 22 the subject matter of Example 21 optionally includes wherein the instructions further comprise instructions that when executed cause at least some of the one or more processors to deliver the virtualization exception through an interrupt descriptor table vector.

In Example 23 the subject matter of Example 21 optionally includes wherein the instructions further comprise instructions that when executed cause at least some of the one or more processors to allow a write to a physical memory address associated with the virtualization exception for a future occurrence of the event.

In Example 24 the subject matter of any of Examples 17-19 optionally includes wherein the instructions that when executed cause at least some of the one or more processors to configure the monitored OS domain to respond to the event comprise instructions that when executed cause at least some of the one or more processors to: switch to an alternate page table; generate a virtual machine exit, responsive to the switch; and invoke a complex rule engine in the out-of-guest agent, responsive to the virtual machine exit.

In Example 25 the subject matter of any of Examples 17-19 optionally includes wherein the instructions further comprise instructions that when executed cause at least some of the one or more processors to deliver future occurrences of the event via a virtualization exception to the in-guest agent without causing a virtual machine exit.

Example 26 is an apparatus for monitoring an operating system, comprising: means for configuring a monitoring policy for a monitored operating system (OS) domain, the monitoring policy including rules for one or more pages of memory associated with the monitored OS domain; means for separating the monitoring policy between an in-guest agent in the monitored OS domain and an out-of-guest agent in a privileged OS domain; means for monitoring execution of untrusted software in the monitored OS domain with a hypervisor; means for detecting an event in the monitored OS domain responsive to the execution of untrusted software; and means for configuring the monitored OS domain to respond to the event using the monitoring policy.

In Example 27 the subject matter of Example 26 optionally includes wherein the means for detecting the event comprises means for detecting a memory violation associated with the one or more pages of memory using the hypervisor.

In Example 28 the subject matter of Example 26 optionally includes wherein the means for detecting the event comprises means for notifying the out-of-guest agent of the event.

In Example 29 the subject matter of any of Examples 26-28 optionally includes wherein the means for configuring the monitored OS domain to respond to the event comprises means for selectively allowing a write to a physical memory address in the monitored OS domain.

In Example 30 the subject matter of any of Examples 26-28 optionally includes wherein the means for configuring the monitored OS domain to respond to the event comprises means for delivering a virtualization exception for the event from a central processing unit to the in-guest agent through an interrupt descriptor table vector without a virtual machine exit.

In Example 31 the subject matter of Example 30 optionally includes wherein the means for delivering the virtualization exception further comprises means for selectively allowing a write to a physical memory address associated with the virtualization exception for a future occurrence of the event.

In Example 32 the subject matter of any of Examples 26-28 optionally includes wherein the means for configuring the monitored OS domain to respond to the event comprises: means for switching to an alternate page table; means for generating a virtual machine exit, responsive to the switch; and means for invoking a complex rule engine in the out-of-guest agent, responsive to the virtual machine exit.

In Example 33 the subject matter of any of Examples 26-28 optionally includes further comprising means for delivering future occurrences of the event via a virtualization exception to the in-guest agent without causing a virtual machine exit.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. One or more non-transitory, machine-readable media, on which are stored instructions, comprising instructions that when executed cause a machine to:
   configure a monitoring policy for a monitored operating system (OS) domain, the monitoring policy including rules for one or more pages of memory associated with the monitored OS domain;
   separate the monitoring policy between an in-guest agent in the monitored OS domain and an out-of-guest agent in a privileged OS domain;
   monitor execution of untrusted software in the monitored OS domain with a hypervisor;
   detect an event in the monitored OS domain responsive to the execution of untrusted software, the event indicative of a read or write access to a memory address;
   configure the monitored OS domain to respond to the event using the monitoring policy;
   detect a subsequent event indicative of a subsequent access to the memory address;
   notify the in-guest agent of the subsequent event via a virtualized exception, the virtualized exception including a semaphore field; and
   in response to a determination by the in-guest agent that the semaphore field is not a reference value, notify the hypervisor of the subsequent event via a virtual machine exit.

2. The one or more non-transitory, machine-readable media of claim 1, wherein the instructions that when executed cause the machine to detect the event comprise instructions that when executed cause the machine to detect a memory violation associated with the one or more pages of memory using the hypervisor.

3. The one or more non-transitory, machine-readable media of claim 1, wherein the instructions that when executed cause the machine to detect the event comprise instructions that when executed cause the machine to notify the out-of-guest agent of the event.

4. The one or more non-transitory, machine-readable media of claim 1, wherein the instructions that when executed cause the machine to configure the monitored OS domain to respond to the event comprise instructions that when executed cause the machine to selectively allow a write to a physical memory address in the monitored OS domain.

5. The one or more non-transitory, machine-readable media of claim 1, wherein the instructions that when executed cause the machine to configure the monitored OS domain to respond to the event comprise instructions that when executed cause the machine to deliver a virtualization exception for the event from a central processing unit to the in-guest agent through an interrupt descriptor table vector.

6. The one or more non-transitory, machine-readable media of claim 5, wherein the instructions that when executed cause the machine to deliver the virtualization exception comprise instructions that when executed cause the machine to selectively allow a write to a physical memory address associated with the virtualization exception for a future occurrence of the event.

7. The one or more non-transitory, machine readable media of claim 1, wherein the instructions further comprise instructions that when executed cause the machine to deliver future occurrences of the event via a virtualization exception to the in-guest agent without causing a virtual machine exit.

8. The method of claim 1, wherein to configure the monitored OS domain comprises to (i) switch to an alternate page table based on the monitoring policy, (ii) generate a virtual machine exit responsive to the switch, and (iii) invoke a complex rule engine in the out-of-guest agent responsive to the virtual machine exit.

9. A method for malware protection, comprising:
configuring, with a computing system, a monitoring policy for a monitored operating system (OS) domain, the monitoring policy including rules for one or more pages of memory associated with the monitored OS domain;
separating, with the computing system, the monitoring policy between an in-guest agent in the monitored OS domain and an out-of-guest agent in a privileged OS domain;
monitoring, with the computing system, execution of untrusted software in the monitored OS domain;
detecting, with the computing system, an event in the monitored OS domain responsive to the execution of untrusted software;
configuring, with the computing system, the monitored OS domain to respond to the event using the monitoring policy;
detecting a subsequent event indicative of a subsequent access to the memory address;
notifying the in-guest agent of the subsequent event via a virtualized exception, the virtualized exception including a semaphore field; and
in response to determining by the in-guest agent that the semaphore field is not a reference value, notifying the hypervisor of the subsequent event via a virtual machine exit.

10. The method of claim 9, further comprising detecting a memory violation associated with the one or more pages of memory using a hypervisor.

11. The method of claim 9, further comprising notifying the out-of-guest agent of the event responsive to detecting the event in the monitored OS domain.

12. The method of claim 9, further comprising allowing a write to a physical memory address in the monitored OS domain responsive to configuring the monitored OS domain to respond to the event.

13. The method of claim 9, further comprising delivering a virtualization exception for the event from a central processing unit to the in-guest agent through an interrupt descriptor table vector responsive to configuring the monitoring policy.

14. The method of claim 13, further comprising allow a write to a physical memory address associated with the virtualization exception for a future occurrence of the event.

15. The method of claim 9, further comprising delivering future occurrences of the event via a virtualization exception to the in-guest agent without causing a virtual machine exit.

16. A computer system for malware protection, comprising:
one or more processors; and
a memory coupled to the one or more processors, on which are stored instructions, comprising instructions that when executed cause at least some of the one or more processors to:
configure a monitoring policy for a monitored operating system (OS) domain, the monitoring policy including rules for one or more pages of memory associated with the monitored OS domain;
separate the monitoring policy between an in-guest agent in the monitored OS domain and an out-of-guest agent in a privileged OS domain;
monitor execution of untrusted software in the monitored OS domain with a hypervisor;
detect an event in the monitored OS domain responsive to the execution of untrusted software; and
configure the monitored OS domain to respond to the event using the monitoring policy;
detect a subsequent event indicative of a subsequent access to the memory address;
notify the in-guest agent of the subsequent event via a virtualized exception, the virtualized exception including a semaphore field; and
in response to a determination by the in-guest agent that the semaphore field is not a reference value, notify the hypervisor of the subsequent event via a virtual machine exit.

17. The computer system of claim 16, wherein the instructions further comprise instructions that when executed cause at least some of the one or more processors to detect a memory violation associated with the one or more pages of memory using the hypervisor.

18. The computer system of claim 16, wherein the instructions further comprise instructions that when executed cause at least some of the one or more processors to notify the out-of-guest agent of the event.

19. The computer system of claim 16, wherein the instructions to configure the monitored OS domain to respond to the event further comprise instructions that when executed cause at least some of the one or more processors to allow a write to a physical memory address in the monitored OS domain.

20. The computer system of claim 16, wherein the instructions to configure the monitored OS domain to respond to the event further comprise instructions that when executed cause at least some of the one or more processors to deliver a virtualization exception for the event from a central processing unit to the in-guest agent.

21. The computer system of claim 20, wherein the instructions further comprise instructions that when executed cause at least some of the one or more processors to deliver the virtualization exception through an interrupt descriptor table vector.

22. The computer system of claim 20, wherein the instructions further comprise instructions that when executed cause at least some of the one or more processors to allow a write to a physical memory address associated with the virtualization exception for a future occurrence of the event.

23. The computer system of claim 16, wherein the instructions further comprise instructions that when executed cause at least some of the one or more processors to deliver future occurrences of the event via a virtualization exception to the in-guest agent without causing a virtual machine exit.

* * * * *